Dec. 1, 1942.   J. R. CORNELIUS   2,303,438
PROTECTIVE COVERS FOR MACHINE-TOOL GUIDES
Filed May 27, 1941   2 Sheets-Sheet 2

Patented Dec. 1, 1942

2,303,438

UNITED STATES PATENT OFFICE 2,303,438

PROTECTIVE COVER FOR MACHINE-TOOL GUIDES

James Richard Cornelius, Coventry, England, assignor to A. C. Wickman Limited, Coventry, England Application May 27, 1941, Serial No. 395,482
In Great Britain July 4, 1940

3 Claims. (Cl. 308—3)

This invention has for its object to enable an effective protective covering to be provided for a machine tool guide without impairing the necessary rigidity of the slide which is movable along the guide and through which the cover passes.

The invention comprises the combination of a plurality of overlapping flexible strips arranged longitudinally over and secured at their ends in fixed relationship to the guide, and a slide having therein passages through which the strips can pass, the strips at opposite ends of the slide being arranged in contact with each other, and the passages in the slide being so disposed as to cause portions of some of the strips lying within the slide to occupy one level and of others to occupy a different level.

In particular the invention comprises a combination as defined in the preceding paragraph, in which the portion of the slide immediately associated with the cover strips consists of three parts, namely an upper part, a lower part, and an intermediate part (or at least one such part), the latter being arranged to lie in a transverse recess formed by the upper and lower parts and being adapted to allow one or more of the strips to pass over it and the other or others under it, the upper and lower parts being secured to the intermediate part at positions not occupied by the strips.

Figure 1:
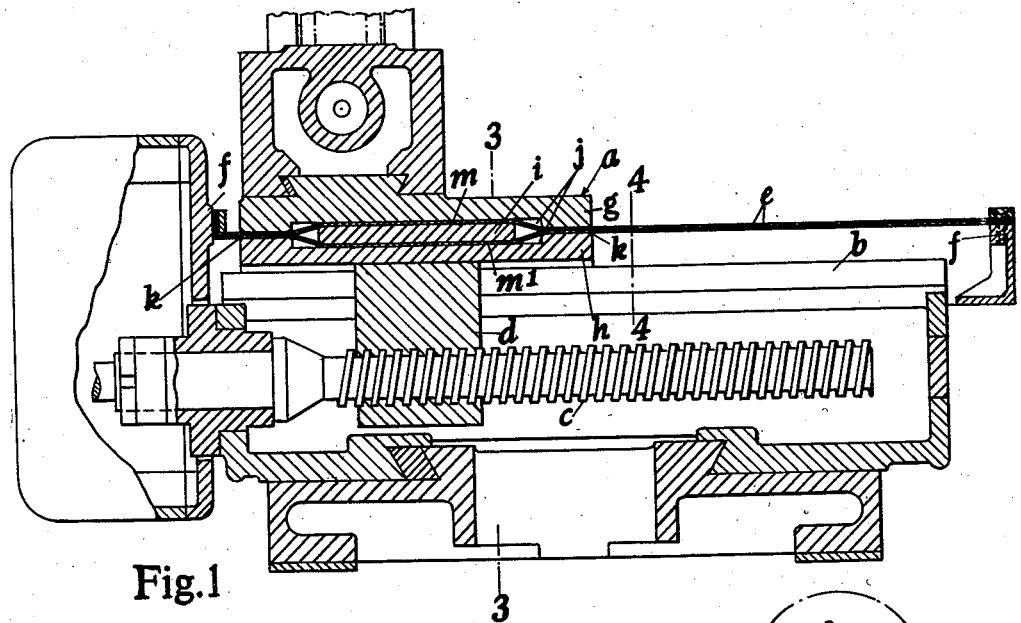
Figure 2:
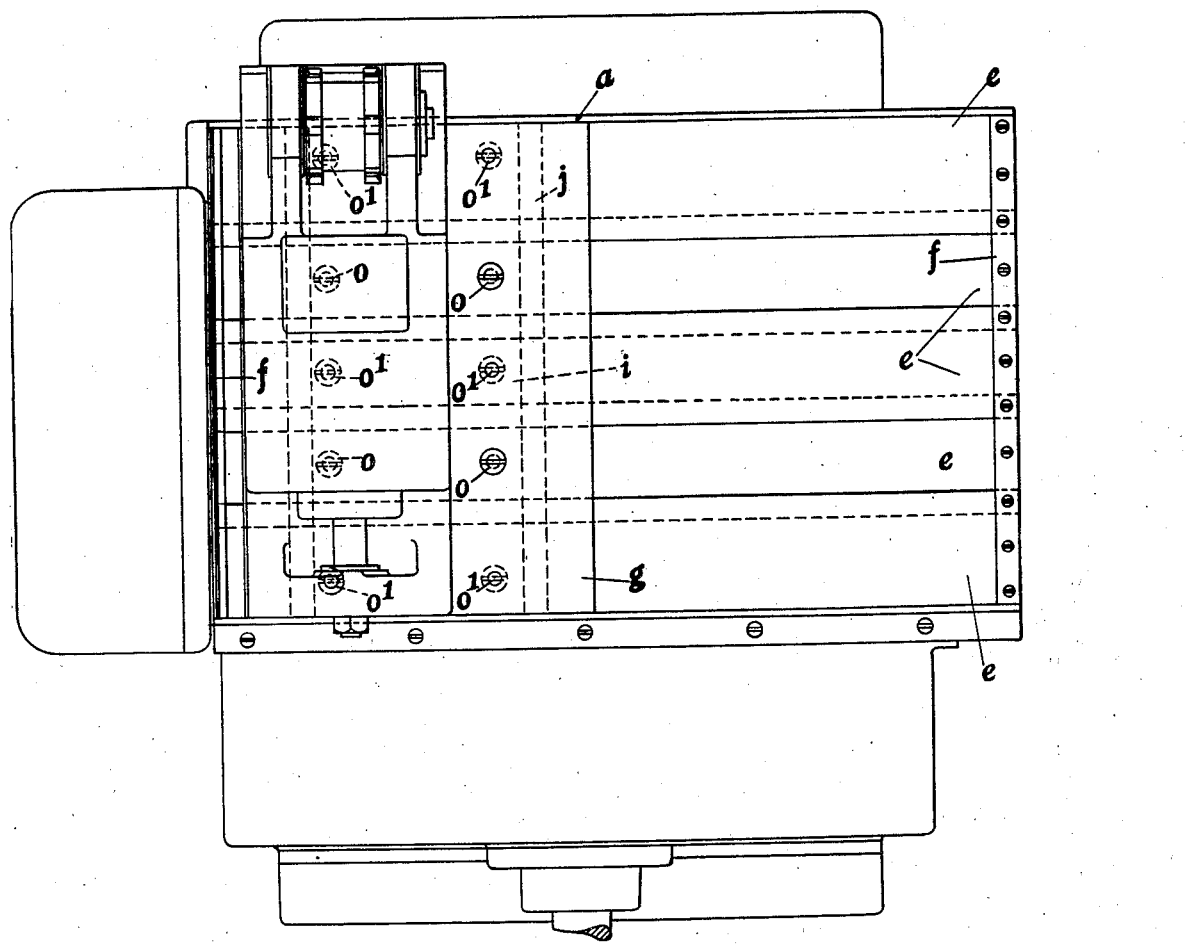

In the accompanying sheets of explanatory drawings:

Figures 1 and 2 are respectively a sectional side elevation and a plan of a part of a machine tool provided with the invention.

Figure 3:
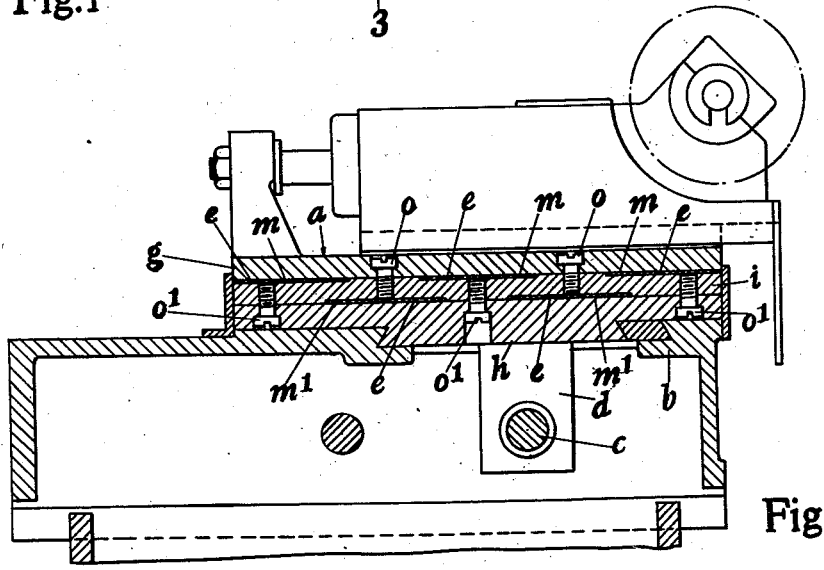
Figure 4:
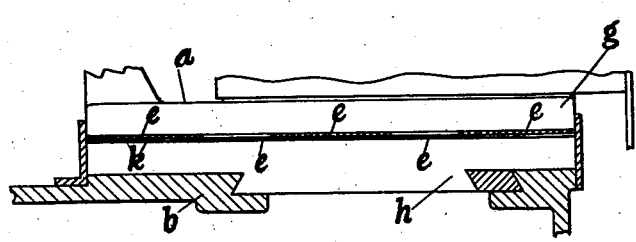

Figures 3 and 4 are sections taken respectively on the lines 3—3 and 4—4 of Figure 1.

In the drawings $a$ indicates a machine tool slide which is movable along a supporting guide $b$ under the action of a rotatable but axially immovable screw $c$ engaging a non-rotatable nut $d$ on the underside of the slide.

In carrying the invention into effect as shown, I employ any convenient number of flexible metal or other suitable strips $e$ of such length and width as will enable them to form a cover for the guide $b$, five such strips of similar form being employed in the example shown, and being arranged parallel with each other in two (upper and lower) layers. Two of the strips form the lower layer and the other three the upper layer. The strips of the lower layer are disposed at a convenient distance apart, and the middle strip of the upper layer is arranged to cover the gap between the strips of the lower layer, the longitudinal edges of this upper strip being caused to overlap the adjacent edges of the two strips in the lower layer. The other two strips of the upper layer overlap and extend beyond the outer edges of the two lower strips. All of the strips $e$ pass through the slide $a$ in the direction of its length, and with the exception of parts lying within the slide the overlapping portions of the strips are in contact with each other. The ends of the strips are secured to anchorages as $f$ either on the guide or on associated parts of the machine in fixed relationship to the guide.

The slide $a$ is adapted in any convenient manner to allow the strips $e$ to pass through it and for this purpose in the example shown the slide comprises three main parts, namely, an upper part $g$, a lower part $h$ and an intermediate part $i$, these parts being secured together as hereinafter described. The under surface of the upper part $g$ and the upper surface of the lower part $h$ are formed with shallow transverse recesses $j$, and the intermediate part $i$ is adapted to be situated in the space formed by these recesses. The parts $g$, $h$, $i$ are such that when assembled a narrow transverse gap $k$ is provided between the upper and lower parts at the forward and rear ends of the slide $a$, the depth of this gap being slightly greater than the thickness of the two layers of strips $e$.

In the upper side of the intermediate part $i$ there are formed three shallow longitudinal grooves $m$ which are adapted to accommodate respectively the adjacent parts of the three strips $e$ in the upper layer, and in the underside of the intermediate part there are formed two shallow longitudinal grooves $m^1$ which are adapted to accommodate respectively the adjacent parts of the two strips $e$ in the lower layer. For securing together the three main parts of the slide $a$, the upper part $g$ is secured to the intermediate part $i$ by screws $o$ which engage portions of the latter part lying between the upper strips $e$, and the lower part $h$ is secured to the intermediate part by screws $o^1$ which engage portions of the latter part lying between and beyond the lower strips.

From the foregoing description it will be understood that when the cover strips $e$ are mounted in position relatively to the slide $a$ and guide $b$, the portions of the strips which extend from the ends of the slide and also the portions of the strips which occupy the entrance and exit gaps $k$ in the slide lie in contact with each other along their overlapping edges. The strips $e$ thus form a continuous cover equivalent to a single sheet for the portions of the guide $b$ not covered by the slide $a$. But portions of the strips $e$ lying within the slide $a$ are separated from each other as a consequence of the condition that some pass over and others pass under the intermediate part $i$. Owing to the flexibility of the strips $e$ they offer no detrimental resistance to the freedom of movement of the slide $a$ relatively to the guide $b$.

The purpose of the construction above described is to enable a guide cover to be provided without impairing the rigidity of the portion of the slide through which the cover passes. By making the cover from strips, and constructing the slide in the manner stated this condition is successfully met.

I wish it to be understood, however, that the invention is not limited to the example above described as subordinate details may be varied to suit different requirements. Thus any desired number of strips may be used to form the cover. Further the intermediate part of the slide may be made from a pair of similar parts arranged parallel with each other instead of from a single piece. Moreover the slide may be constructed from a single piece or from two or more pieces adapted to provide at different levels upper and lower passages for the strips, these passages extending parallel with each other entirely across the slide, and the entrance and exit gaps being formed by separate parts attached to the ends of the slide. Also, if desired, cover pieces may be attached to the slide adjacent to the outer edges of the outer strips, and the portion of the slide where the strips are separated may be adapted to form a bath for lubricant or cleansing liquid, the entrance and exit gaps being then provided with any convenient wipers.

Having thus described my invention what I claim as new and desire to secure by Letters Patent is:

1. A protective cover for a machine tool slide-supporting guide, comprising the combination with the guide, of a plurality of overlapping flexible strips arranged longitudinally over and secured at their ends in fixed relationship to the guide, and a slide having passages by which the strips pass through the slide, the passages being arranged so that the strips are spaced apart at different levels over at least the greater part of the length of the slide, and the strips at opposite ends of the slide being arranged in contact with each other.

2. A protective cover as claimed in claim 1, in which the portion of the slide immediately associated with the cover strips consists of a plurality of detachable parts, namely, an upper part, a lower part, and at least one intermediate part arranged to lie in a transverse recess formed by the uper and lower parts, the said detachable parts being shaped to form between them the passages by which the strips pass through the slide and the upper and lower parts being secured to the intermediate part at positions not occupied by the strips.

3. A protective cover as claimed in claim 1, in which the portion of the slide immediately associated with the cover strips consists of three parts, namely, an upper part, a lower part, and an intermediate part, the latter being arranged to lie in a transverse recess formed by the upper and lower parts and being grooved to accommodate the strips over and under it, and the upper and lower parts being secured to the intermediate part at positions not occupied by the strips.

JAMES RICHARD CORNELIUS.